US012686388B2

(12) United States Patent (10) Patent No.: US 12,686,388 B2
Ishiguro (45) Date of Patent: Jul. 21, 2026

(54) VEHICLE CONTROL DEVICE, STORAGE MEDIUM STORING COMPUTER PROGRAM FOR VEHICLE CONTROL, AND METHOD FOR CONTROLLING VEHICLE

(71) Applicants: TOYOTA JIDOSHA KABUSHIKI KAISHA, Toyota (JP); AISIN CORPORATION, Kariya (JP)

(72) Inventor: Seiya Ishiguro, Shinagawa-ku (JP)

(73) Assignees: TOYOTA JIDOSHA KABUSHIKI KAISHA, Toyota (JP); AISIN CORPORATION, Kariya (JP)

( * ) Notice: Subject to any disclaimer, the term of this patent is extended or adjusted under 35 U.S.C. 154(b) by 64 days.

(21) Appl. No.: 18/623,534

(22) Filed: Apr. 1, 2024

(65) Prior Publication Data

US 2024/0400053 A1 Dec. 5, 2024

(30) Foreign Application Priority Data

Jun. 2, 2023 (JP) ................................. 2023-091891

(51) Int. Cl.
*B60W 30/16* (2020.01)
*G06V 40/16* (2022.01)
(52) U.S. Cl.
CPC ......... *B60W 30/162* (2013.01); *G06V 40/178* (2022.01)
(58) Field of Classification Search
CPC ........................... B60W 30/162; G06V 40/178
See application file for complete search history.

(56) References Cited

U.S. PATENT DOCUMENTS

| | | | | |
|---|---|---|---|---|
| 11,685,407 | B2 * | 6/2023 | Horiba | B60W 60/001 |
| | | | | 701/25 |
| 2009/0010488 | A1 | 1/2009 | Matsuoka et al. | |
| 2012/0083960 | A1 * | 4/2012 | Zhu | B60R 1/23 |
| | | | | 701/23 |
| 2015/0198448 | A1 * | 7/2015 | Sanma | B62D 1/046 |
| | | | | 701/400 |
| 2023/0398988 | A1 * | 12/2023 | Barrett | B60W 40/09 |
| 2024/0344369 | A1 * | 10/2024 | Perez Barrera | B60R 21/34 |

FOREIGN PATENT DOCUMENTS

| | | |
|---|---|---|
| JP | H05256170 A | 10/1993 |
| JP | 2000264097 A | 9/2000 |
| JP | 2009-15548 A | 1/2009 |
| JP | 2017117249 A | 6/2017 |
| JP | 2019194088 A | 11/2019 |
| JP | 2020-29210 A | 2/2020 |
| JP | 2021-67086 A | 4/2021 |

* cited by examiner

*Primary Examiner* — Masud Ahmed
(74) *Attorney, Agent, or Firm* — Sughrue Mion, PLLC

(57) ABSTRACT

A vehicle control device has a processor configured to estimate an age of a driver based on a facial image representing a face of the driver of a vehicle, to calculate a distance between the vehicle and a moving object detected based on a front image, to determine whether or not the age of the driver is above a predetermined reference age and the distance between the vehicle and the moving object is below a predetermined reference distance, and to decide either to restrict the speed of the vehicle to below a first reference speed or to restrict a reflection of accelerating operation by the driver for acceleration of the vehicle in traveling of the vehicle, when it has been determined that the age of the driver is above the reference age and the distance between the vehicle and the moving object is below the reference distance.

5 Claims, 5 Drawing Sheets

VEHICLE CONTROL DEVICE, STORAGE MEDIUM STORING COMPUTER PROGRAM FOR VEHICLE CONTROL, AND METHOD FOR CONTROLLING VEHICLE

FIELD

The present disclosure relates to a vehicle control device, a storage medium storing a computer program for vehicle control, and a method for controlling a vehicle.

BACKGROUND

Vehicle drivers include drivers of a variety of age groups, from youth to the elderly. Older persons generally have reduced visual field, perceptual ability, movement ability or judgment compared to younger persons.

The ability of older persons to drive is therefore impaired in comparison to younger persons. When a moving object appears ahead of the vehicle, precise control of the vehicle is often necessary. However, impaired driving ability of the driver can potentially affect operation of the vehicle in such cases.

Japanese Unexamined Patent Publication No. 2009-015548, for example, proposes a driving support device that increases the timing speed for obstacle approach warnings in a manner corresponding to increased age of the driver.

SUMMARY

Elderly drivers may also conduct improper driving maneuvers in some cases. For example, an elderly driver may erroneously operate the brake or accelerator when a moving object such as a pedestrian appears ahead.

The driving support device described in Japanese Unexamined Patent Publication No. 2009-015548 increases the timing for warning the driver of an approaching obstacle, but cannot prevent improper driving maneuvers by the driver.

It is an object of the present disclosure to provide a vehicle control device that can inhibit improper behavior of a vehicle resulting from erroneous speed operation by an elderly driver when a moving object has appeared ahead.

(1) One embodiment of the invention provides a vehicle control device, which has a processor configured to estimate the age of a driver based on a facial image representing the face of the driver of a vehicle, calculate a distance between the vehicle and a moving object detected based on a front image representing a state ahead of the vehicle, determine whether or not the age of the driver is above a predetermined reference age and the distance between the vehicle and the moving object is below a predetermined reference distance, and decide either to restrict the speed of the vehicle to below a first reference speed or to restrict a reflection of accelerating operation by the driver for acceleration of the vehicle in traveling of the vehicle, when it has been determined that the age of the driver is above the reference age and the distance between the moving object and the vehicle is below the reference distance.

(2) In the vehicle control device of embodiment (1) above, it is preferable that the processor is further configured to determine whether or not the speed of the vehicle is above a predetermined second reference speed, decide to restrict the reflection of accelerating operation by the driver for acceleration of the vehicle in traveling of the vehicle, when it has been determined that the age of the driver is above the reference age, the distance between the moving object and the vehicle is below the reference distance and the speed of the vehicle is above the second reference speed, and decide to restrict the speed of the vehicle to below the first reference speed, when it has been determined that the age of the driver is above the reference age, the distance between the moving object and the vehicle is below the reference distance and the speed of the vehicle is not above the second reference speed.

(3) In the vehicle control device of embodiment (2) above, it is preferable that the processor is further configured to change the second reference speed according to the current speed of the vehicle.

(4) In the vehicle control device of any one of embodiments (1) to (3) above, it is preferable that the processor is further configured to change the degree of restriction on the reflection of accelerating operation by the driver for acceleration of the vehicle in traveling of the vehicle, according to the current speed of the vehicle.

(6) According to another embodiment, a storage medium storing a computer program for vehicle control is provided. The computer program for vehicle control causes a processor to execute a process and the process includes estimating the age of a driver based on a facial image representing the face of the driver of a vehicle, calculating a distance between the vehicle and a moving object detected based on a front image representing a state ahead of the vehicle, determining whether or not the age of the driver is above a predetermined reference age and the distance between the vehicle and the moving object is below a predetermined reference distance, and deciding to restrict the speed of the vehicle to below a first reference speed or to restrict a reflection of accelerating operation by the driver for acceleration of the vehicle in traveling of the vehicle, when it has been determined that the age of the driver is above the reference age and the distance between the moving object and the vehicle is below the reference distance.

(7) Another embodiment of the invention provides a method for controlling a vehicle. The method for controlling a vehicle is carried out by a vehicle control device and the method includes estimating the age of a driver based on a facial image representing the face of the driver of a vehicle, calculating a distance between the vehicle and a moving object detected based on a front image representing a state ahead of the vehicle, determining whether or not the age of the driver is above a predetermined reference age and the distance between the vehicle and the moving object is below a predetermined reference distance, and deciding to restrict the speed of the vehicle to below a first reference speed or to restrict a reflection of accelerating operation by the driver for acceleration of the vehicle in traveling of the vehicle, when it has been determined that the age of the driver is above the reference age and the distance between the moving object and the vehicle is below the reference distance.

The vehicle control device of the present disclosure can inhibit improper behavior of a vehicle resulting from speed operation by a driver who is older than a reference age, when a moving object has appeared ahead, and can thus improve vehicle safety.

The object and advantages of the invention will be realized and attained by means of the elements and combinations particularly specified in the claims. It is to be understood that both the foregoing general description and the following detailed description are exemplary and explanatory and are not restrictive of the invention, as claimed.

DESCRIPTION OF EMBODIMENTS

Figure 1A:
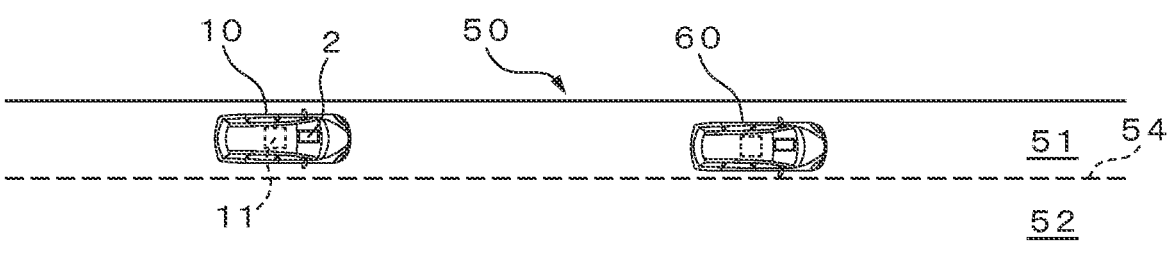
FIG. 1A is a diagram showing operation of a vehicle control device of a first embodiment in overview, and showing a road on which the vehicle is traveling.
Figure 1B:
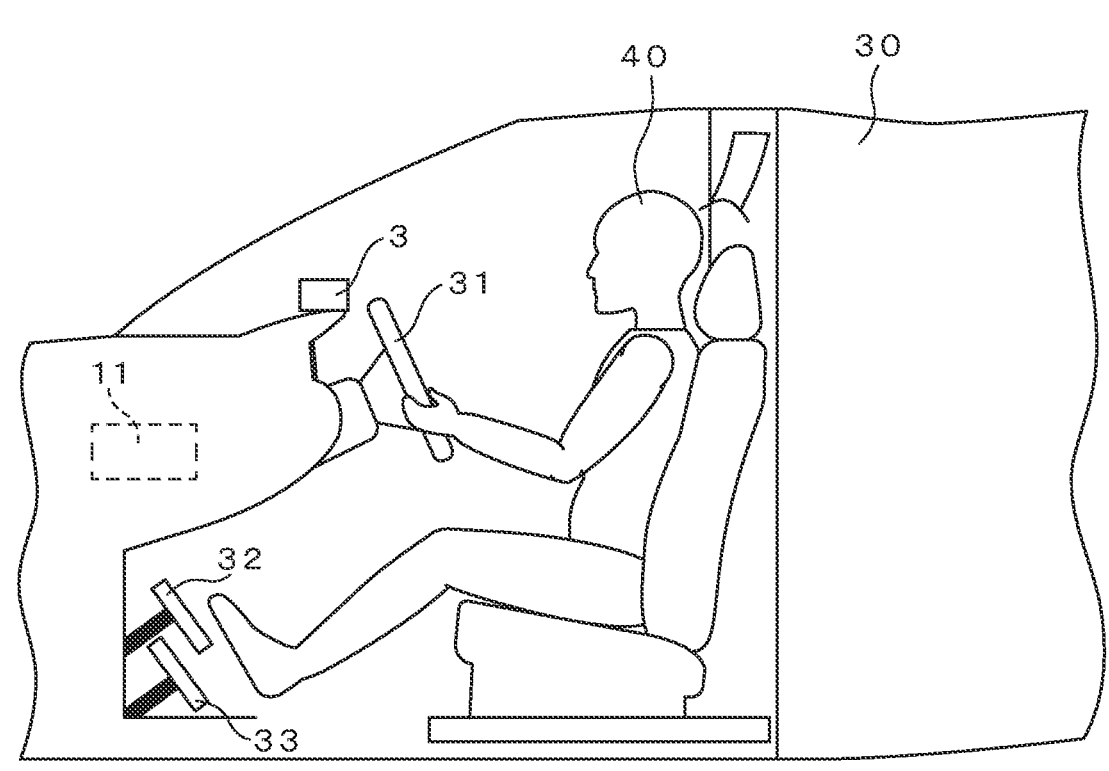
FIG. 1B is a diagram showing operation of the vehicle control device of the first embodiment in overview, and showing a driver driving the vehicle in the cabin.

FIG. 1A and FIG. 1B are diagrams illustrating operation of the vehicle control device 11 of the first embodiment in overview. FIG. 1A shows a road 50 on which the vehicle 10 is traveling, and FIG. 1B shows the driver 40 driving the vehicle 10 in the cabin 30. Operation relating to vehicle control processing by the vehicle control device 11 disclosed herein will now be described in overview with reference to FIG. 1A and FIG. 1B.

The vehicle 10 has a front camera 2, a monitoring camera 3 and the vehicle control device 11. The vehicle control device 11 controls operation of the vehicle 10 according to two driving modes with different degrees of participation of the driver 40 for driving. The vehicle 10 may also be a self-driving vehicle.

For example, the vehicle control device 11 has a self-driving mode in which the degree to which the driver 40 participates in driving is low (for example, driving mode with levels 3 to 5) and a manual driving mode in which the degree to which the driver 40 participates in driving is high (for example, driving mode with levels 0 to 2).

Inside the cabin 30, the driver 40 operates the vehicle 10 in a driving mode. In self-driving mode, the vehicle 10 is driven primarily by the vehicle control device 11. In manual driving mode, the vehicle 10 is driven primarily by the driver 40. In manual driving mode, the driver 40 uses the steering wheel 31, accelerator pedal 32 and brake pedal 33 for operation to drive the vehicle 10.

The vehicle 10 is traveling on the road 50, as shown in FIG. 1A. The road 50 has two lanes 51, 52. The lane 51 and lane 52 are divided by a lane marking line (lane boundary line) 54. The vehicle 10 is traveling in the lane 51 while another vehicle 60 is traveling ahead of the vehicle 10.

The vehicle control device 11 acquires a facial image in which the face of the driver 40 is represented, through the monitoring camera 3. The vehicle control device 11 estimates the age of the driver 40 based on the facial image. In the example shown in FIG. 1B, the vehicle control device 11 estimates the age of the driver 40 to be 70 years, based on the facial image. The driver 40 is thus considered to be an elderly person.

Through the front camera 2, the vehicle control device 11 acquires a front image representing the state ahead of the vehicle 10. Based on the front image, the vehicle control device 11 detects another vehicle 60 running ahead of the vehicle 10. The vehicle 60 is an example of a moving object. Based on the front image, the vehicle control device 11 also estimates the distance between the vehicle 60 and the vehicle 10, based on the front image. In the example shown in FIG. 1A, the vehicle control device 11 estimates the distance between the vehicle 60 and vehicle 10 to be 30 m.

The vehicle control device 11 determines that the age of the driver (70) is above a reference age (such as 65), and that the distance between the vehicle 60 and vehicle 10 (30 m) is below a reference distance (such as 50 m).

The vehicle control device 11 then decides to restrict the speed of the vehicle 10 to no higher than a first reference speed (such as 20 km/h). When the current speed of the vehicle 10 is 40 km/h, for example, it decides to decelerate the speed of the vehicle 10 to 20 km/h.

In the example shown in FIG. 1A, suppose that an elderly driver 40 has operated the accelerator pedal 32 erroneously instead of operating the brake pedal 33, as driving operation for the vehicle 60.

The vehicle control device 11, however, does not permit control of the speed of the vehicle 10 to exceed 20 km/h, even if the accelerator pedal 32 is operated by the driver 40.

As explained above, when a vehicle 60 has appeared ahead, the vehicle control device 11 of this embodiment can inhibit improper behavior of the vehicle 10 resulting from speed operation by the driver 40 who is older than a reference age, and can thus improve the safety of the vehicle 10.

Figure 2:
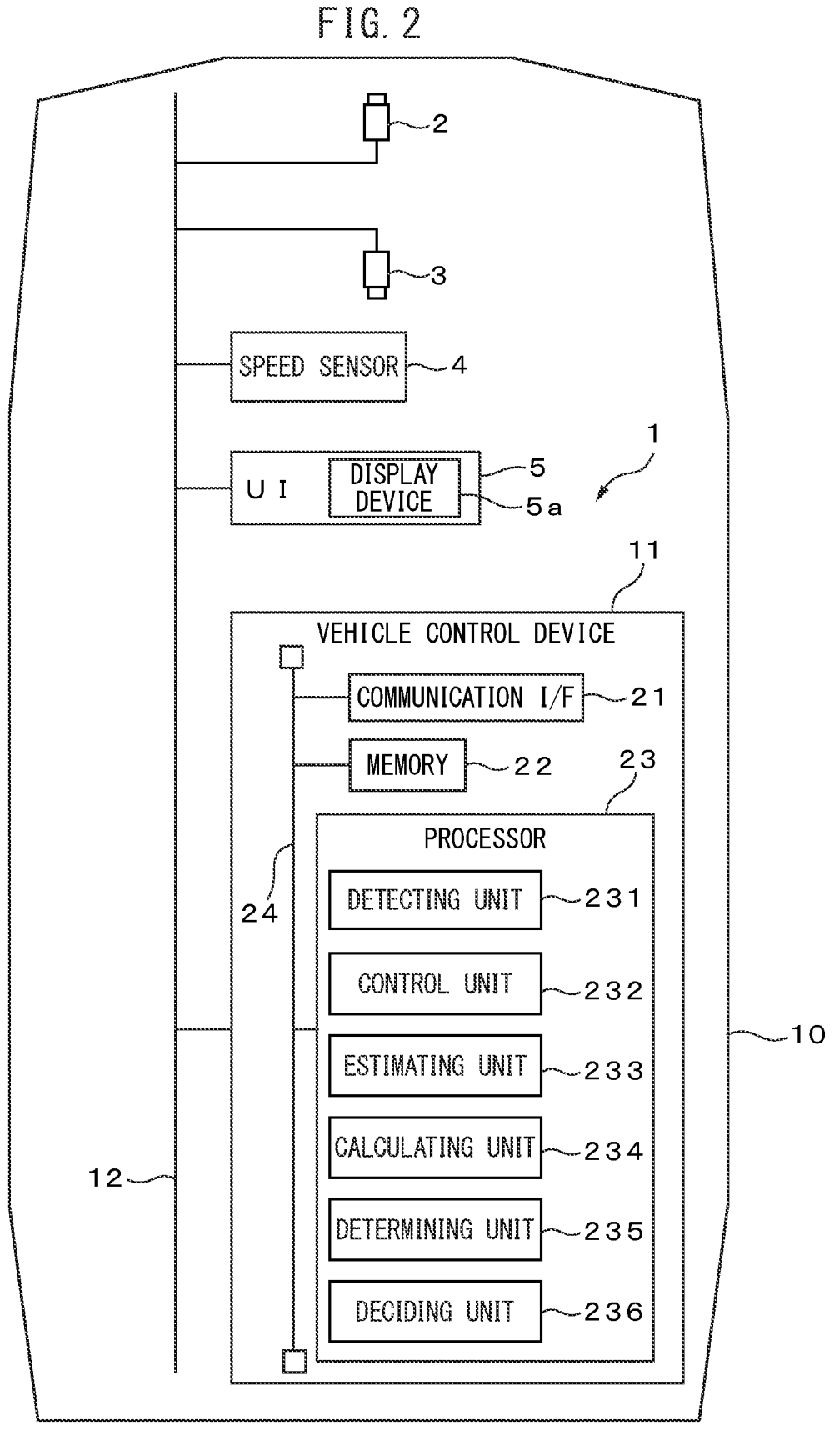
FIG. 2 is a general schematic drawing of a vehicle in which a vehicle control system is mounted that has a vehicle control device of the first embodiment.

FIG. 2 is a general schematic drawing of a vehicle 10 in which a vehicle control system 1 is mounted that has a vehicle control device 11 of the embodiment. The vehicle 10 has a front camera 2, a monitoring camera 3, a speed sensor 4, a user interface (UI) 5 and a vehicle control device 11. The vehicle control system 1 at least includes the vehicle control device 11. The vehicle 10 may also have a distance sensor such as a LiDAR sensor, for measurement of the distance of the vehicle 10 and objects ahead of the vehicle 10.

The front camera 2, monitoring camera 3, speed sensor 4, UI 5 and vehicle control device 11 are connected in a communicable manner via an in-vehicle network 12 conforming to the Controller Area Network standard.

The front camera 2 is an example of an imaging unit provided in the vehicle 10. The front camera 2 is mounted on the vehicle 10 and directed toward the front of the vehicle 10. The front camera 2, for example, takes a front image in which the situation in a predetermined region ahead of the vehicle 10 is shown, at a predetermined cycle. The front image can show the road in the predetermined region ahead of the vehicle 10, and road features such as surface lane marking lines on the road. The front camera 2 has a 2D detector composed of an array of photoelectric conversion elements with visible light sensitivity, such as a CCD or C-MOS, and an imaging optical system that forms an image of the photographed region on the 2D detector.

Each time a front image is taken, the front camera 2 outputs the front image and front camera imaging time at which the front image was taken, to the vehicle control device 11 via the in-vehicle network 12. At the vehicle control device 11, the front image is used for processing to estimate the location of the vehicle 10, as well as for processing to detect objects around the vehicle 10.

The monitoring camera 3 is disposed in the vehicle cabin 30 in a manner allowing it to photograph facial images including the face of the driver 40 driving the vehicle 10. The monitoring camera 3 is an example of an imaging unit. The monitoring camera 3 photographs a facial image representing the conditions including the driving seat at a facial imaging time at a predetermined cycle. The monitoring camera 3 has a 2D detector composed of an array of photoelectric conversion elements with infrared sensitivity, such as a CCD or C-MOS, and an imaging optical system that forms an image of the photographed region on the 2D detector. The facial image is used for processing by the vehicle control device 11 to estimate the age of the driver 40.

The speed sensor 4 detects speed information representing the speed of the vehicle 10. The speed sensor 4 has a measuring device that measures the rotational speed of the tires of the vehicle 10. The speed sensor 4 outputs the speed information to the vehicle control device 11 via the in-vehicle network 12. The speed information is used for processing by the vehicle control device 11 to calculate the speed of the vehicle 10.

The UI 5 is an example of the notification unit. The UI 5, controlled by the vehicle control device 11, notifies the driver 40 of operating information relating to the vehicle 10. The operating information relating to the vehicle 10 includes traveling information for the vehicle 10. The UI 5 has a display device 5a such as a liquid crystal display or touch panel, for display of the operating information. The UI 5 may also have an acoustic output device (not shown) to notify the driver 40 of operating information. The UI 5 also creates an operation signal in response to operation of the vehicle 10 by the driver 40. The operation information may be, for example, a destination location, transit points, vehicle speed, or a request for transfer of driving mode. The UI 5 also has a touch panel or operating button, for example, as an input device for inputting operation information from the driver 40 to the vehicle 10. The UI 5 outputs the input operation information to the vehicle control device 11 via the in-vehicle network 12.

The vehicle control device 11 carries out detection processing, control processing, estimation processing, calculation processing, determination processing and decision processing. For this purpose, the vehicle control device 11 has a communication interface (IF) 21, a memory 22 and a processor 23. The communication IF 21, the memory 22 and the processor 23 are connected via a signal wire 24. The communication IF 21 has an interface circuit to connect the vehicle control device 11 with the in-vehicle network 12.

The memory 22 is an example of a storage unit, and it has a volatile semiconductor memory and a non-volatile semiconductor memory, for example. The memory 22 stores an application computer program and various data to be used for information processing carried out by the processor 23 of each device.

All or some of the functions of the vehicle control device 11 are functional modules driven by a computer program operating on the processor 23, for example. The processor 23 has a detecting unit 231, a control unit 232, an estimating unit 233, a calculating unit 234, a determining unit 235 and a deciding unit 236. Alternatively, the functional module of the processor 23 may be a specialized computing circuit in the processor 23. The processor 23 comprises one or more CPUs (Central Processing Units) and their peripheral circuits. The processor 23 may also have other computing circuits such as a logical operation unit, numerical calculation unit or graphics processing unit.

The detecting unit 231 detects objects ahead of the vehicle 10 and their types (for example, vehicles) based on front images. Objects also include moving objects such as vehicles traveling ahead of the vehicle 10. The detecting unit 231 has an classifier that detects objects represented in the front images, by inputting the front images. The detecting unit 231 may use as the classifier a convolutional neural network (CNN) that has been trained beforehand to detect objects represented in input front images, for example.

When a moving object such as a vehicle or person has been detected as an object, the detecting unit 231 also identifies the traveling lane in which the moving object is traveling, based on lane marking lines represented in the map information and the location of the moving object. The detecting unit 231 notifies the control unit 232, calculating unit 234 and determining unit 235 of object detection information which includes information indicating the type of the detected object, information indicating its location and the traveling lane, and the front image in which the object is represented and information representing the location of the object in the front image.

The map information is stored in the memory 22. The map information preferably has high-precision map information including three-dimensional information for the road surface, information for the types and locations of structures and road features such as road lane marking lines, and the legal speed limit for the road.

The control unit 232 controls operation including traveling of the vehicle 10. The control unit 232 has two driving modes with different degrees of participation of the driver 40 in driving. The control unit 232 controls the operation of the vehicle 10 according to the driving mode.

For example, the control unit 232 has a self-driving mode in which the degree to which the driver 40 participates in driving is low (for example, driving mode with levels 3 to 5) and a manual driving mode in which the degree to which the driver 40 participates in driving is high (for example, driving mode with levels 0 to 2). In self-driving mode, the vehicle 10 is driven primarily by the control unit 232. In manual driving mode, the vehicle 10 is driven primarily by the driver 40.

In the driving mode in which the degree to which the driver 40 participates in driving is low, all or some of the driving operations necessary for traveling of the vehicle 10 may be executed automatically, while in the driving mode in which the degree to which the driver 40 participates in driving is high, the types of driving operations executed automatically may be less than in the driving mode in which the degree to which the driver 40 participates in driving is low, or are zero.

In self-driving mode, the control unit 232 generates a driving plan to control actions such as steering, engine actuation and braking based on map information and on detection information from sensors (not shown) mounted in the vehicle 10. The control unit 232 outputs the automatic control signal based on the driving plan, to an actuator (not shown) that controls the steering wheel, a drive unit (not shown), or the brake (not shown), via the in-vehicle network 12.

In manual driving mode, the control unit 232 generates a manual control signal to control operation of the vehicle 10 such as steering, actuation and braking based on operation by the driver 40, and outputs the manual control signal to an actuator for actuation of the steering wheel, and to a drive unit or brake, via the in-vehicle network 12.

The control unit 232 can drive the vehicle 10 in self-driving mode in regions where self-driving mode is permitted (for example, regions where a high-precision map has been prepared for control of the vehicle 10). In regions where self-driving mode is not permitted, the control unit 232 controls the vehicle 10 in manual driving mode. In response to a request by the driver 40, the control unit 232 switches from self-driving mode to manual driving mode or from manual driving mode to self-driving mode. The control unit 232 also transfers from self-driving mode to manual driving mode when it has determined that the vehicle 10 cannot be safely driven in self-driving mode.

The vehicle control device 11 is an electronic control unit (ECU), for example. In FIG. 2, the detecting unit 231, control unit 232, estimating unit 233, calculating unit 234, determining unit 235 and deciding unit 236 were explained as a single device, but the estimating unit 233, calculating unit 234, determining unit 235 and deciding unit 236 may be separate devices from the detecting unit 231 and/or control unit 232.

Figures 3, 4:
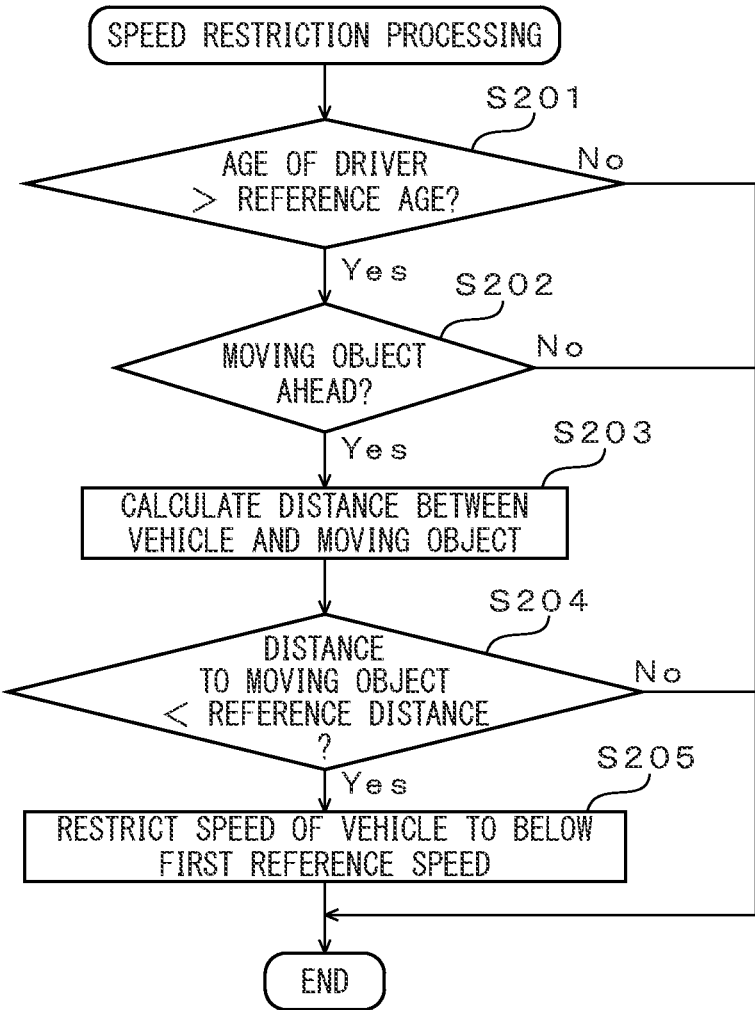
FIG. 3 is an example of an operation flow chart for age estimation processing by the vehicle control device of the first embodiment.
FIG. 4 is an example of an operation flow chart for speed restriction processing by the vehicle control device of the first embodiment.

FIG. 3 is an example of an operation flow chart for age estimation processing by the vehicle control device 11 of the embodiment. Age estimation processing by the vehicle control device 11 will be described below with reference to FIG. 3. The vehicle control device 11 carries out age estimation processing according to the operation flow chart shown in FIG. 3, at an age estimating time having a predetermined cycle. The cycle for age estimation processing is preferably equal to or greater than the cycle in which facial images are taken. The age estimation processing may also be carried out at the moment of a predetermined event such as ignition ON or driver exchange, instead of at a predetermined cycle. Age estimation processing is an example of vehicle control processing.

The estimating unit 233 first acquires a facial image from the monitoring camera 3 (step S101).

Next, the estimating unit 233 estimates the age of the driver 40 based on facial images representing the face of the driver 40 of the vehicle 10 (step S102), and the series of processing steps is complete. The estimating unit 233 has a classifier that detects the age of a person represented in the facial images, by inputting the facial images. The estimating unit 233 may use as the classifier a convolutional neural network (CNN) that has been trained beforehand to detect the ages of persons represented in input facial images, for example. The estimating unit 233 notifies the determining unit 235 of the estimated age of the driver 40.

FIG. 4 is an example of an operation flow chart for speed restriction processing by the vehicle control device of the embodiment. Speed restriction processing by the vehicle control device 11 will be described below with reference to FIG. 4. The vehicle control device 11 carries out speed restriction processing according to the operation flow chart shown in FIG. 4, at a speed restriction processing time having a predetermined cycle. The cycle for carrying out speed restriction processing is preferably longer than the cycle for age estimation processing. Speed restriction processing is an example of vehicle control processing. The speed restriction processing shown in FIG. 4 is carried out while driving of the vehicle 10 is in manual driving mode.

First, the determining unit 235 determines whether or not the age of the driver 40 as estimated by the estimating unit 233 is older than a predetermined reference age (step S201). The reference age is preferably an age that allows determination of whether or not the driver 40 is an elderly person. The reference age may be from 65 to 70, for example. The reference age is not limited to this age range, however.

When the age of the driver 40 is above the reference age (step S201—Yes), the determining unit 235 determines whether or not a moving object has been detected ahead of the vehicle 10 (step S202). The determining unit 235 determines whether or not a moving object has been detected ahead of the vehicle 10 based on the object detection information provided from the detecting unit 231. Moving objects include vehicles, humans and bicycles, for example. When the type of object included in the object detection information is one of these types of moving objects, the determining unit 235 determines that a moving object has been detected ahead of the vehicle 10. When no object detection information has been received or no moving object is included in the object detection information, on the other hand, the determining unit 235 determines that a moving object has not been detected ahead of the vehicle 10.

When a moving object has been detected ahead of the vehicle 10 (step S202—Yes), the calculating unit 234 calculates the distance between the vehicle 10 and the moving object detected based on the front image representing the state ahead of the vehicle 10 (step S203). The calculating unit 234 detects lane marking lines in the front image delineating the traffic lane in which the moving object is traveling, based on information representing the location of the moving object in the front image within the object detection information.

The calculating unit 234 has a classifier that detects lane marking lines represented in the front images, by inputting the front images. The detecting unit 231 may use as the classifier a convolutional neural network (CNN) that has been trained beforehand to detect lane marking lines represented in input front images, for example.

The calculating unit 234 also detects regions of the pair of lane marking lines on either side of the location of the moving object in the front images. The location of the moving object in the front image is the location in the direction coinciding with the traveling direction of the vehicle 10 in the front images. The calculating unit 234 calculates the number of pixels representing the width between the pair of lane marking lines in the direction perpendicular to the traveling direction of the vehicle 10 in the front image. The number of pixels representing the width between the pair of lane marking lines is the width of the lane in which the moving object is traveling.

The calculating unit 234 may also acquire the width of the lane in which the vehicle 10 is currently traveling, based on map information and the current location of the vehicle 10 and map information. The width of the lane in which the moving object located ahead of the vehicle 10 is traveling is assumed to be equal to the width of the lane in which the vehicle 10 is currently traveling.

The calculating unit 234 calculates the distance between the vehicle 10 and the lane of the location where the moving object is traveling, based on the width of the lane of the location in which the moving object is traveling, the number of pixels representing the width of the lane where the moving object is traveling, the focal length of the front camera 2 and the mounting position and mounting angle of the front camera 2 on the vehicle 10. The focal length of the front camera 2 and the mounting position and mounting angle of the front camera 2 on the vehicle 10 are stored in the memory 22. The distance between the vehicle 10 and the lane of the location where the moving object is traveling represents the distance between the moving object and the vehicle 10.

When the distance between the moving object and the vehicle 10 cannot be calculated, the calculating unit 234 may notify the driver 40 via the UI 5 of a transfer request to transfer driving of the vehicle 10 from manual driving mode to self-driving mode. When the driver 40 acknowledges the transfer request, the vehicle 10 begins driving in self-driving mode. This can prevent erroneous operation by the driver 40.

The method for calculating the distance between the moving object and the vehicle 10 is not limited to the method described above, incidentally. For example, when the vehicle 10 has a LiDAR sensor, the LiDAR sensor may be used to calculate the distance between the moving object and the vehicle 10.

The determining unit 235 then determines whether or not the distance between the moving object and the vehicle 10 as calculated by the calculating unit 234 is below a predetermined reference distance (step S204). The reference distance may also be a fixed value (such as 50 m). The reference distance may also be changed depending on the current speed of the vehicle 10. For example, when the speed of the vehicle 10 is 30 km/h or lower, the reference distance may be 30 m. When the speed of the vehicle 10 is above 30 km/h, the reference distance may be ⅟₅₀₀ of the distance that the vehicle 10 will travel in 1 hour at its current speed (represented in km/h).

The reference distance may also be changed depending on the age of the driver 40. For example, the reference distance is preferably longer for an older age of the driver 40.

When the distance between the moving object and the vehicle 10 is below the reference distance (step S204—Yes), the deciding unit 236 decides to restrict the speed of the vehicle 10 to no higher than the first reference speed (step S205), and the series of processing steps is complete. The first reference speed may also be a fixed value (such as 30 km/h). The first reference speed may also be changed depending on the current speed of the vehicle 10. For example, when the speed of the vehicle 10 is 30 km/h or lower, the first reference speed may be 10 m/h, and when the speed of the vehicle 10 is higher than 30 km/h, the first reference speed may be ½ of the speed of the vehicle 10 (represented as km/h).

The deciding unit 236 may calculate the current speed of the vehicle 10 based on speed information acquired from the speed sensor 4.

The deciding unit 236 notifies the control unit 232 of a speed restriction request indicating that the speed of the vehicle 10 is to be restricted to no higher than the first reference speed. The control unit 232 controls the speed of the vehicle 10 so that the speed of the vehicle 10 is no higher than the first reference speed even when the vehicle 10 is in manual driving mode.

The deciding unit 236 notifies the driver 40 via the UI 5 that the speed of the vehicle 10 is to be restricted to no higher than the first reference speed. This allows the driver 40 to recognize that the speed of the vehicle 10 will be restricted to no higher than the first reference speed.

On the other hand, when the age of the driver 40 is not older than the reference age (step S201—No), when no moving object has been detected ahead of the vehicle 10 (step S202—No), or when the distance between the moving object and the vehicle 10 is not less than the predetermined reference distance (step S204—No), the series of processing steps is complete.

The deciding unit 236 may also cancel the speed restriction request if it has been determined by the determining unit 235 that a predetermined reference time has elapsed without detection of a moving object ahead of the vehicle 10.

Vehicle control processing by the vehicle control device 11 will be described below with reference to FIG. 1A. In the example shown in FIG. 1A, the determining unit 235 has determined that the age of the driver is above the reference age and the distance between the vehicle 60 and the vehicle 10 is less than the reference distance.

The deciding unit 236 then decides to restrict the speed of the vehicle 10 to no higher than a first reference speed (such as 20 km/h). When the current speed of the vehicle 10 is 40 km/h, for example, the speed of the vehicle 10 is restricted to no higher than 20 km/h.

For example, suppose that an elderly driver 40 has intended to decelerate the vehicle 10 so that the vehicle 10 does not approach the vehicle 60. However, the driver 40 has erroneously operated the accelerator pedal 32 when the intention was to operate the brake pedal 33.

The control unit 232, however, does not allow control of the speed of the vehicle 10 to exceed 20 km/h, even if the accelerator pedal 32 is operated by the driver 40. Since the speed of the vehicle 10 therefore does not increase even if the driver 40 operates the accelerator pedal 32, it is possible to prevent the vehicle 10 from approaching the vehicle 60.

As explained above, when a moving object has appeared ahead, the vehicle control device of this embodiment can inhibit improper behavior of the vehicle resulting from speed operation by a driver who is older than a reference age, and can thus improve the safety of the vehicle.

A second and third modification of the vehicle control device of this embodiment will now be described with reference to FIG. 5 and FIG. 6. The explanation in regard to the first embodiment applies as appropriate to processing in the second and third embodiments that are the same as the first embodiment.

Figure 5:
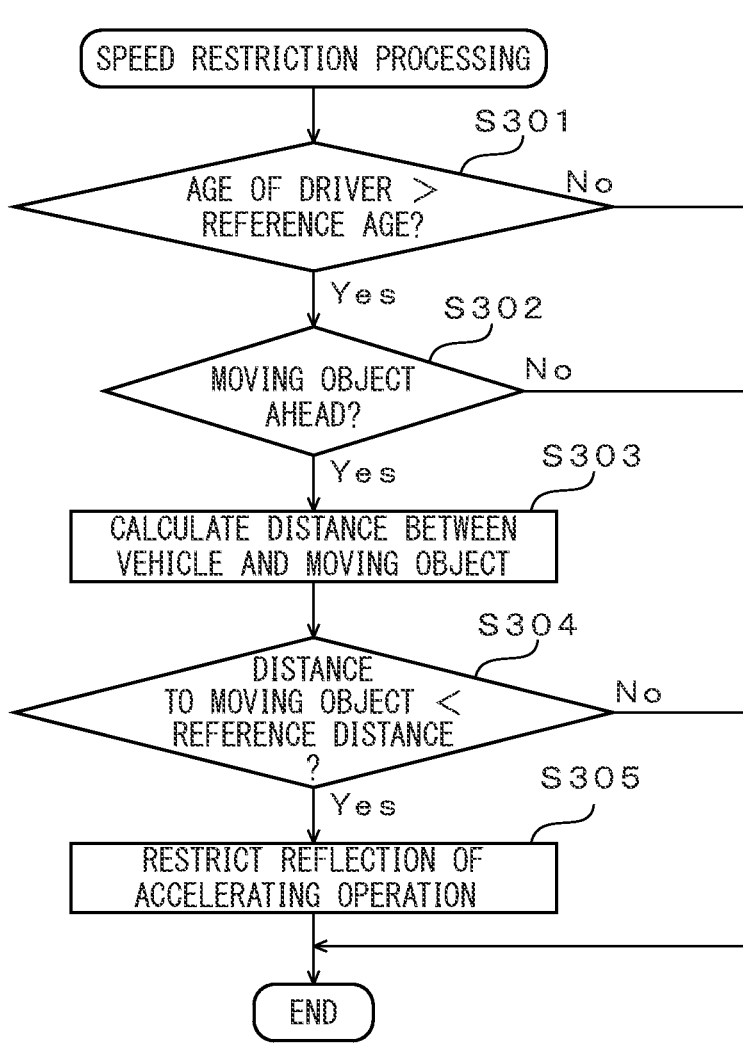
FIG. 5 is an example of an operation flow chart for speed restriction processing by a second vehicle control device.

FIG. 5 is an example of an operation flow chart for speed restriction processing by the vehicle control device of the second embodiment.

Processing in step S305 of this embodiment differs from step S205 of the first embodiment. The processing in steps S301 to S304 of this embodiment are the same as in steps S201 to S204 described above.

When the distance between the moving object and the vehicle 10 is below the reference distance (step S304—Yes), the deciding unit 236 decides to restrict the reflection of acceleration operation for acceleration of the vehicle 10 by the driver 40 in traveling of the vehicle 10 (step S305), and the series of processing steps is complete. The deciding unit 236 notifies the control unit 232 of an acceleration restriction request to restrict the reflection of acceleration operation by the driver 40 for acceleration of the vehicle 10 in traveling of the vehicle 10.

When an acceleration restriction request is received, the control unit 232 changes (reduces) the amount of acceleration at the drive unit, which is decided based on the degree of operation of the accelerator pedal 32. For example, when an acceleration restriction request is received, the control unit 232 changes the amount of acceleration at the drive unit which is decided based on the degree of operation of the accelerator pedal 32, to a relative amount of ⅓ to ½. This can relatively reduce the amount of acceleration of the vehicle 10 for the same degree of operation of the accelerator pedal 32.

Restricting the reflection of acceleration operation by the driver 40 for acceleration of the vehicle 10 in traveling of the vehicle 10 is not limited to the mode described above. For example, a reaction force generating device is installed in the accelerator pedal 32 to generate reaction force against operation of the accelerator pedal 32 by the driver 40. When an acceleration restriction request has been received, the control unit 232 may control the reaction force generating device so that it increases the reaction force against operation of the accelerator pedal 32. This will relatively reduce the degree of operation of the accelerator pedal 32 with operation of the accelerator pedal 32 by the same force from the driver 40.

The deciding unit 236 may also cancel the acceleration restriction request if it has been determined by the determining unit 235 that a predetermined reference time has elapsed without detection of a moving object ahead of the vehicle 10.

In the example shown in FIG. 1A, the determining unit 235 has determined that the age of the driver is above the reference age and the distance between the vehicle 60 and the vehicle 10 is less than the reference distance.

The deciding unit 236 decides to restrict the reflection of acceleration operation by the driver 40 for acceleration of the vehicle 10 in traveling of the vehicle 10.

The deciding unit 236 may also notify the driver 40 via the UI 5, that the reflection of acceleration operation by the driver 40 for acceleration of the vehicle 10 in traveling of the vehicle 10 is to be restricted. This will allow the driver 40 to recognize that there will be restriction on the reflection of acceleration operation by the driver 40 in traveling of the vehicle 10.

For example, suppose that an elderly driver 40 has intended to decelerate the vehicle 10 so that the vehicle 10 does not approach the vehicle 60. However, the driver 40 has erroneously operated the accelerator pedal 32 when the intention was to operate the brake pedal 33.

The control unit 232 changes (reduces by half) the amount of acceleration at the drive unit which is decided based on the degree of operation of the accelerator pedal 32. Since the speed of the vehicle 10 is restricted even if the driver 40 operates the accelerator pedal 32, it is possible to prevent the vehicle 10 from approaching the vehicle 60.

As explained above, when a moving object has appeared ahead, the vehicle control device of this modified embodiment can further inhibit improper behavior of the vehicle resulting from acceleration operation by a driver who is older than a reference age, and can thus further improve the safety of the vehicle.

Figure 6:
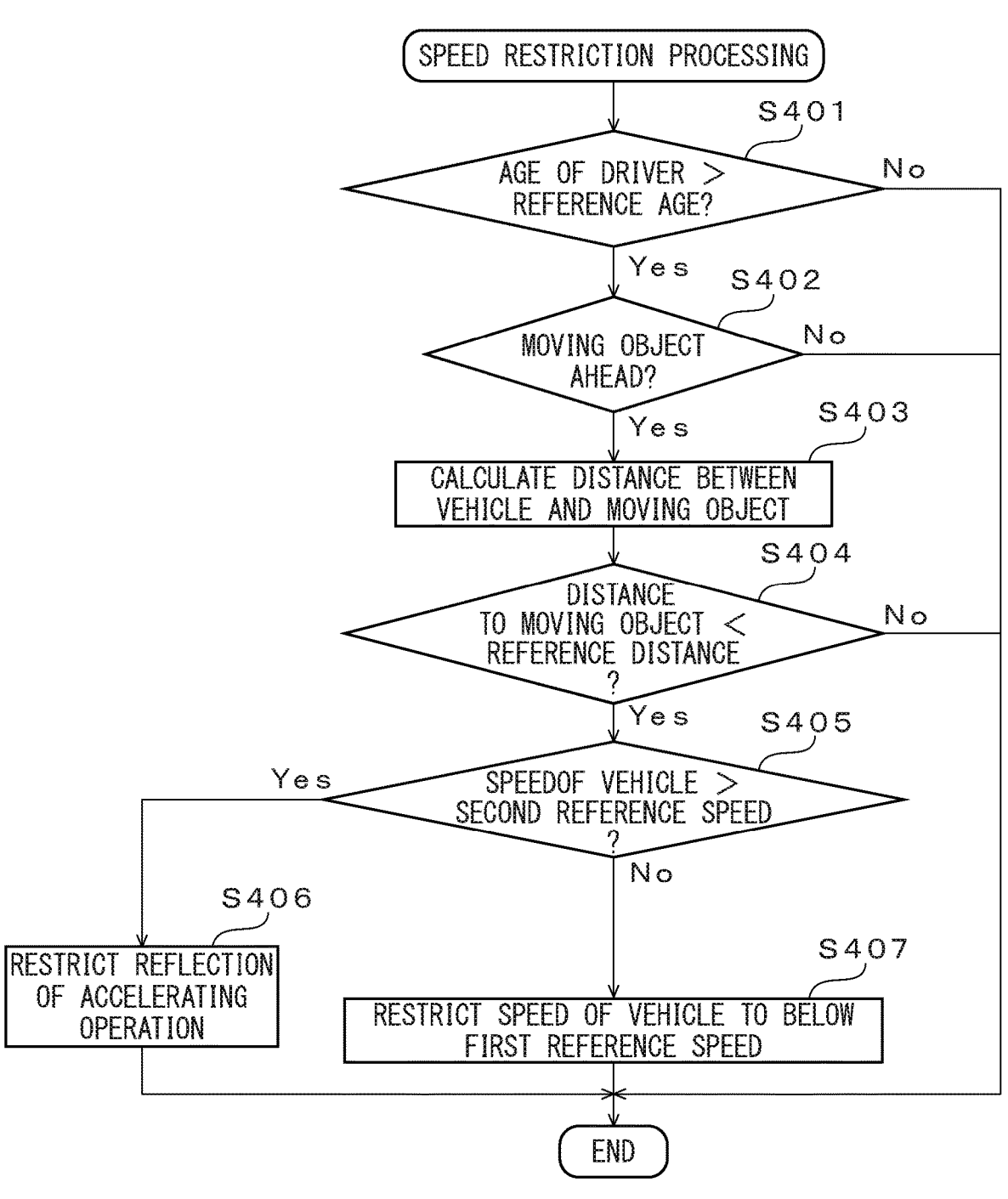
FIG. 6 is an example of an operation flow chart for speed restriction processing by a third vehicle control device.

FIG. 6 is an example of an operation flow chart for speed restriction processing by the vehicle control device of the third embodiment. In the third embodiment, for processes similar to the first or second embodiments, the description of the first embodiment is provided as appropriate.

This embodiment differs from the embodiments described above in that steps S405 and S406 are added. The processing in steps S401 to S404 and step S407 of this modified example are the same as in steps S201 to S205 described above. The processing in step S406 of this modified example is the same as in step S305.

When the distance between the moving object and the vehicle 10 is below the reference distance (step S404—Yes), the determining unit 235 determines whether or not the speed of the vehicle 10 is above a predetermined second reference speed (step S405). The second reference speed may also be a fixed value (such as 30 km/h). The second reference speed may also be changed depending on the current speed of the vehicle 10. For example, when the speed of the vehicle 10 is less than 10 km/h, the second reference speed may be 5 km/h or lower, when the speed of the vehicle 10 is 10 km/h to 30 km/h, the second reference speed may be 10 km/h or lower, and when the speed of the vehicle 10 is 30 m/h to 50 km/h, the second reference speed may be 20 km/h to 40 km/h.

When the speed of the vehicle 10 is above the second reference speed (step S405—Yes), the deciding unit 236 decides to restrict the reflection of acceleration operation by the driver 40 for acceleration of the vehicle 10 in traveling of the vehicle 10 (step 406), and the series of processing steps is complete. The deciding unit 236 notifies the control unit 232 of an acceleration restriction request to restrict the reflection of acceleration operation by the driver 40 for acceleration of the vehicle 10 in traveling of the vehicle 10.

When the speed of the vehicle 10 is above the second reference speed, it is considered that the vehicle 10 is traveling at a relatively fast speed. Making it more difficult for the vehicle 10 to accelerate helps prevent approach of the vehicle 10 to the moving object which is ahead.

When the speed of the vehicle 10 is not above the second reference speed (step S405—No), the deciding unit 236 decides to restrict the speed of the vehicle 10 to no higher than the first reference speed, (step S407), and the series of processing steps is complete.

When the speed of the vehicle 10 is not above the predetermined second reference speed, it is considered that the vehicle 10 is not traveling at a fast speed. Restricting the speed of the vehicle 10 helps prevent approach of the vehicle 10 to the moving object which is ahead.

As explained above, when a moving object has appeared ahead, the vehicle control device of this modified embodiment can inhibit improper behavior of the vehicle resulting from speed operation or acceleration operation by a driver who is older than a reference age, depending on the current speed of the vehicle, and can thus further improve the safety of the vehicle.

The vehicle control device, the computer program for vehicle control and the method for controlling a vehicle according to the embodiments described above may incorporate appropriate modifications that are still within the gist of the disclosure. Moreover, the technical scope of the disclosure is not limited to these embodiments, and includes the invention and its equivalents as laid out in the Claims.

For example, according to the embodiment described above, the deciding unit decides either to restrict the speed of the vehicle to below the first reference speed or to restrict a reflection of accelerating operation by the driver for acceleration of the vehicle in traveling of the vehicle, when it has been determined that the age of the driver is above the reference age or the distance between the vehicle and the moving object is below the reference distance. However, the deciding unit may instead decide to both restrict the speed of the vehicle to below the first reference speed and to restrict the reflection of accelerating operation by the driver for acceleration of the vehicle i in traveling of the vehicle, when it has been determined that the age of the driver is above the reference age and the distance between the vehicle and the moving object is below the reference distance.

In addition, according to the second embodiment and third embodiment described above, the deciding unit may change the degree of restriction on the reflection of accelerating operation by the driver for acceleration of the vehicle in traveling of the vehicle, according to the current speed of the vehicle. For example, the deciding unit may increase the degree of restriction on the reflection of acceleration operation in traveling of the vehicle, for faster speeds of the vehicle.

The invention claimed is:

1. A vehicle control device comprising:
a processor configured to
estimate an age of a driver based on a facial image representing a face of the driver of a vehicle, based on a determination that the age of the driver is above a predetermined reference age, calculate a distance between the vehicle and a moving object detected based on a front image representing a state ahead of the vehicle, determine whether the distance between the vehicle and the moving object is below a predetermined reference distance, based on the distance between the moving object and the vehicle being below the reference distance, determine whether a speed of the vehicle is above a second reference speed, based on (i) the speed of the vehicle being above the second reference speed, (ii) the distance between the moving object and the vehicle being below the reference distance, and (iii) the age of the driver being above the reference age, restrict a reflection of accelerating operation by the driver for acceleration of the vehicle in traveling of the vehicle, based on (i) the speed of the vehicle not being above the second reference speed, (ii) the distance between the moving object and the vehicle being below the reference distance, and (iii) the age of the driver being above the reference age, restrict the speed of the vehicle to below a first reference speed, and based on the age of the driver not being above the reference age, do not restrict the reflection of accelerating operation by the driver for acceleration of the vehicle in traveling of the vehicle and do not restrict the speed of the vehicle to below the first reference speed.

2. The vehicle control device according to claim 1, wherein the processor is further configured to change the second reference speed according to the current speed of the vehicle.

3. The vehicle control device according to claim 1, wherein the processor is further configured to change the degree of restriction on the reflection of accelerating operation by the driver for acceleration of the vehicle in traveling of the vehicle, according to the current speed of the vehicle.

4. A computer-readable, non-transitory storage medium storing a computer program for vehicle control, which causes a processor to execute a process and the process comprises:

estimating an age of a driver based on a facial image representing a face of the driver of a vehicle;

based on a determination that the age of the driver is above a predetermined reference age, calculating a distance between the vehicle and a moving object detected based on a front image representing a state ahead of the vehicle;

determining whether the distance between the vehicle and the moving object is below a predetermined reference distance;

based on the distance between the moving object and the vehicle being below the reference distance, determine whether a speed of the vehicle is above a second reference speed, based on (i) the speed of the vehicle being above the second reference speed, (ii) the distance between the moving object and the vehicle being below the reference distance, and (iii) the age of the driver being above the reference age, restricting a reflection of accelerating operation by the driver for acceleration of the vehicle in traveling of the vehicle;

based on (i) the speed of the vehicle not being above the second reference speed, (ii) the distance between the moving object and the vehicle being below the reference distance, and (iii) the age of the driver being above the reference age, restricting the speed of the vehicle to below a first reference speed; and based on the age of the driver not being above the reference age, not restricting the reflection of accelerating operation by the driver for acceleration of the vehicle in traveling of the vehicle and not restricting the speed of the vehicle to below the first reference speed.

5. A method for controlling a vehicle, which is carried out by a vehicle control device and the method comprises:

estimating an age of a driver based on a facial image representing a face of the driver of a vehicle;

based on a determination that the age of the driver is above a predetermined reference age, calculating a distance between the vehicle and a moving object detected based on a front image representing a state ahead of the vehicle;

determining whether the distance between the vehicle and the moving object is below a predetermined reference distance;

based on the distance between the moving object and the vehicle being below the reference distance, determine whether a speed of the vehicle is above a second reference speed, based on (i) the speed of the vehicle being above the second reference speed, (ii) the distance between the moving object and the vehicle being below the reference distance, and (iii) the age of the driver being above the reference age, restricting a reflection of accelerating operation by the driver for acceleration of the vehicle in traveling of the vehicle;

based on (i) the speed of the vehicle not being above the second reference speed, (ii) the distance between the moving object and the vehicle being below the reference distance, and (iii) the age of the driver being above the reference age, restricting the speed of the vehicle to below a first reference speed; and based on the age of the driver not being above the reference age, not restricting the reflection of accelerating operation by the driver for acceleration of the vehicle in traveling of the vehicle and not restricting the speed of the vehicle to below the first reference speed.

* * * * *